UNITED STATES PATENT OFFICE.

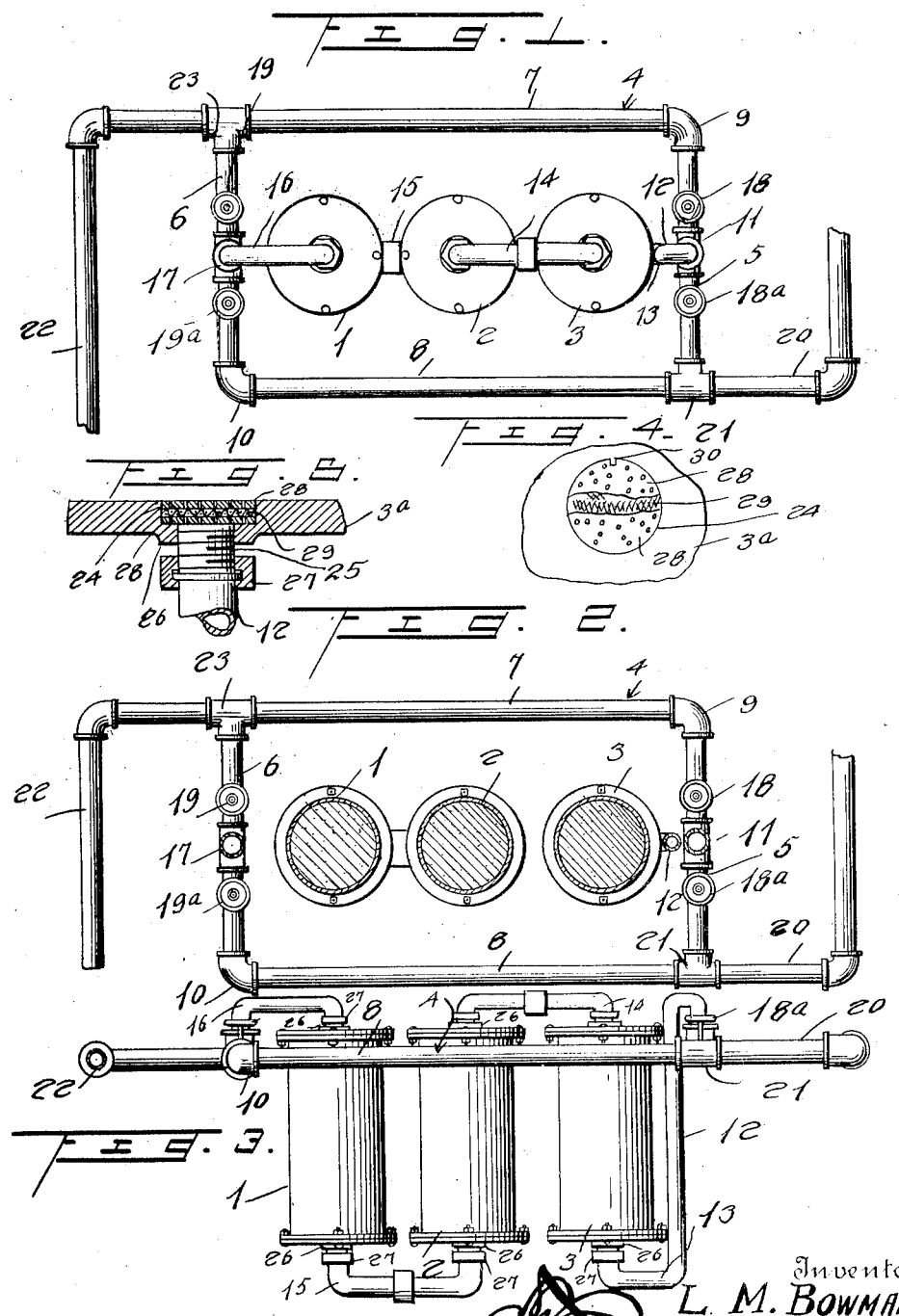

LEVI M. BOWMAN, OF TULSA, OKLAHOMA, ASSIGNOR OF ONE-HALF TO W. A. SMITH, OF TULSA, OKLAHOMA.

MEANS FOR AND PROCESS OF FILTERING PETROLEUM PRODUCTS.

1,347,932.

Specification of Letters Patent.

Patented July 27, 1920.

Application filed September 25, 1918. Serial No. 255,662.

*To all whom it may concern:*

Be it known that I, LEVI M. BOWMAN, a citizen of the United States, residing at Tulsa, in the county of Tulsa and State of Oklahoma, have invented certain new and useful Improvements in Means for and Process of Filtering Petroleum Products; and I do hereby declare the following to be a full, clear, and exact description of the invention, such as will enable others skilled in the art to which it appertains to make and use the same.

This invention relates to a process for filtering petroleum products such as gasolene, coal oil, and similar by-products of petroleum, and simple and efficient means whereby this process may be carried into effect.

One of the main objects of the invention is to provide a process whereby coal oil, gasolene, and similar by-products of petroleum may be quickly and readily filtered so as to give a clear product free from foreign materials and coloring matters.

A further object is to provide simple and efficient means for carrying this process into effect by means of which the direction of flow of the products being filtered through the filtering medium may be reversed thus rendering it possible to filter a maximum quantity of fluid for a given quantity of filtering medium.

Further objects will appear from the detailed description.

In the drawings:

Figure 1 is a top plan view of a filtering means for carrying my process into effect.

Fig. 2 is a similar view with the top plates or cover members of the containers for the filtering medium removed.

Fig. 3 is a side view of the filter.

Fig. 4 is a top plan view of one of the strainers.

Fig. 5 is a section through one of the cylinder heads showing the strainer in edge view.

In the refining processes now in common use, gasolene, coal oil, or other products of petroleum which it is desired to refine are filtered by being passed through a substantially cylindrical container or tank which is filled with "fuller's earth," or a substitute therefor, which provides the filtering medium. The oil to be treated is admitted to this tank at the upper end thereof and is then forced through the fuller's earth under pressure, being withdrawn from the lower end of the tank and discharged into suitable storage tanks or vats. The fuller's earth, which is very efficient as a filtering medium, serves to remove particles of foreign materials and coloring matter giving a clear liquid. After the oil has flowed through this fuller's earth for a comparatively short time, it becomes so saturated with foreign materials as to lose, to a great extent, its filtering properties the oil then becoming off color, after which the tank or container is opened and the fuller's earth removed therefrom manually, a new supply of earth being placed in the tank before it is again used. As by far the greater amount of fuller's earth used for filtering purposes is imported from Argentina, with the exception of a very poor grade which is found in Florida, and as this material is very heavy, the renewal of the fuller's earth in filters in oil refineries constitutes a very heavy expense item. I have found that, by reversing the direction of flow of the oil through the fuller's earth it is possible to increase its efficiency as a filtering medium approximately sixty-six and two-thirds per cent., and it is the primary object of this invention to provide a process whereby this increase in efficiency in the fuller's earth may be attained thus materially reducing the cost of operating a filter of this character.

In my process, the oil to be filtered is first passed through the fuller's earth in one direction for a predetermined time, or until the filtered liquid comes from the filter slightly off color, after which the direction of flow is reversed, when the filter will act to produce a perfectly clear liquid for an approximately great length of time. I have illustrated in the drawings a filter for carrying this process into effect in which a plurality, in this instance three, of cylindrical containers 1, 2 and 3, are positioned adjacent each other so as to form a continuous series, these containers being placed in vertical position and having their ends closed by flanged heads removably secured thereto, as shown. A pipe frame designated generally by 4 is mounted about the containers, this frame being composed of the end pipes 5 and 6 and the side pipes 7 and 8 which are connected to end pipes 5 and 6 by elbows 9 and 10, respectively. End pipe 5 is connected, at the central portion thereof, by a T 11 to a substantially L-shaped pipe 12, the lower end of which communicates, as at 13, with the interior of container 3 at the lower end thereof. The upper end of tank 3 is connected by a pipe 14 to the upper end of tank 2, the lower end of this latter tank being connected by a pipe 15 to the lower end of tank 1. The upper end of tank 1 is connected by means of a pipe 16 and a T 17 to the end pipe 6 of frame 4 at the central portion thereof. In this manner, the tanks or containers are connected to each other and to the pipe frame so as to permit liquid to be forced therethrough in either direction, suitable means being provided for controlling the direction of the flow of the liquid. In practice, each of the tanks 1, 2 and 3 is filled for the greater portion of its height with fuller's earth so that liquid which is forced to pass through the same will be caused to travel through vertical columns of this material so as to be thoroughly cleaned and filtered thereby. The cylinders are, preferably, of relatively small diameter thus insuring that all of the fuller's earth will be utilized for filtering purposes. This avoids the great waste which occurs in filters in which the filtering medium is arranged in a column of relatively great diameter, and in which the central portion only of the column is utilized, the outer portion becoming merely oil soaked and having no active part in the filtering operation. As will be noted, this liquid or oil in passing through one of the tanks will travel in an opposite direction to which it travels in passing through the adjoining tank or tanks and therefore the direction of flow through the tanks is alternately reversed so as to facilitate precipitation of foreign materials in this oil thus materially assisting the filtering operation.

End pipe 5 is provided, adjacent each end of the T 11 with control valves 18 and 18ª of suitable type, end pipe 6 being provided adjacent the ends of T 17 with similar control valves 19 and 19ª. An oil supply pipe 20 is connected by a T 21 with the side pipe 8 of the pipe frame and with the end pipe 5, an oil discharge pipe 22 being similarly connected with end pipe 6 and side pipe 7 by means of a T 23. By closing valves 18 and 19ª, and opening valves 18ª and 19, oil which is supplied to pipe 20 under pressure may be caused to flow through pipe 5 to pipe 12, through the fuller's earth contained in cylinders 3, 2 and 1, in the order named, and from cylinder 1 through pipe 16 to pipe 6, from which it is discharged through the discharge pipe 22. This oil will be caused to flow through a plurality of vertical columns of fuller's earth so as to be thoroughly cleaned and filtered thereby before being discharged through pipe 22. When the oil, which is flowing through discharge pipe 22, commences to be off color, valves 19 and 18ª are closed, valves 19ª and 18 being opened. This by-passes the oil from pipe 20 through the side pipe 8 of the pipe frame 4 and end pipe 6 so that this oil enters first cylinder 1 at the top end thereof, this oil flowing through the cylinders 1, 2 and 3 in the order named and then into end pipe 5 through pipe 12, the oil then flowing through valve 18, a portion of pipe 5, and side pipe 7, being discharged therefrom through discharge pipe 22. In this manner, the direction of flow of the oil through the filter may be readily and easily changed without interfering with the operation of the filter.

The closure plate or head 3ª at the lower end of cylinder 3 is provided with a central recess 24 in its upper face, this recess being concentric with a nipple 25 secured in a boss 26 provided at the central portion of the plate and in communication at its upper end with the recess. Pipe 12 is secured to this nipple by a union joint designated generally by 27. The recess 24 is adapted to receive two perforated disks 28 which fit snugly therein, these disks being formed of suitable metal or other material having the requisite strength. A straining disk 29 of fabric or suitable fiber is positioned between the disks 28 and held securely thereby in position. The oil which is forced through pipe 12 under pressure is caused to flow through the straining disk 29 so as to have the particles of foreign materials removed therefrom, the coloring matter being removed from the oil by the filtering medium. This strainer serves to prevent clogging or stopping of the filter due to the collection therein of quantities of relatively large particles of foreign materials. I have found that by using a straining disk of fabric or fiber, the weave of which is of the proper coarseness according to the oil being strained, the capacity of the filter is materially increased so as to permit a relatively great quantity of oil to flow therethrough within a given time. When straining relatively thick or heavy oil the disk 29 should be of a lightly woven fabric or of a fiber the threads of which are spaced a relatively great distance apart thus permitting easy passage of the liquid or oil through the disk while catching all particles of foreign materials. When filtering relatively light oil a comparatively heavy disk should be placed between the perforated disks 28, such as a disk of closely woven canvas or other suitable material. The light oil will pass readily through this disk while the disk will act to catch the particles of foreign materials. In this manner, the strainer may be readily adjusted to suit the particular by-products being filtered, the particular strainer used being adapted to permit passage of a relatively great quantity of oil or other by-products in a comparatively short space of time. By thus varying the density or weave of the straining disk according to the thickness of the oil being strained, instead of using a disk of heavy and close weave for heavy oil and of light weave for light oil such as is the present practice, I am enabled to obtain a greater output for the filter as well as securing greater ease of operation. As will be noted more clearly from Fig. 4, to insure proper alining of the perforations in the retaining disks 28, each of these disks is provided with a peripheral notch or recess which receives a lug projecting inwardly from the annular wall of the recess, it being understood that the recesses in disks 28 are so related as to insure register of the perforations of these disks when in the position illustrated.

Preferably, though not necessarily, a strainer of this character is provided for each of the connecting pipes of the cylinders so as to insure thorough straining of the oil. As will be noted, the pipes for establishing communication between the cylinders, are secured to the closure plates or heads thereof by union couplings. This permits ready removal of the heads of the cylinders for renewal of the filtering medium, when required, as well as facilitating cleaning or renewal of the strainers.

I have found that by reversing the direction of flow of the oil or other liquid being filtered the capacity of the filter may be increased approximately sixty-six and two-thirds per cent. For example, in using a filter having a capacity of three thousand barrels when the oil is passed therethrough in one direction only, as soon as the oil which flows from the filter commences to be off color I reverse the direction of flow of the oil through the filter. For a very short time after the direction of flow has been reversed, the oil discharged from the filter will be off color due to the fact that this reversal in direction of flow results in washing out the filtering medium so as to remove therefrom particles of coloring matter which have accumulated during the first flow of the oil. After the oil has been flowing in a reverse direction to its original direction of flow, however, for a very brief time, the particles of coloring matter are completely washed out of the filtering medium giving a perfectly clear product. By continuing the reverse direction of flow it is possible to obtain approximately two thousand barrels additional of perfectly clear oil free from all coloring matter. In this manner, a filter which, under the present process would have a capacity of but three thousand barrels has its capacity quickly and easily increased to approximately five thousand barrels. This results in reducing the cost of renewal of filtering material approximately sixty-six and two-thirds per cent., thus effecting a great saving in this industry. Also, by arranging the fuller's earth in columns of relatively small diameter I insure that all of the filtering material will be utilized for filtering purposes, thus effecting a material saving in this respect.

In carrying the invention into effect, it will be understood that any suitable means for reversing the direction of flow of the liquid being filtered through the filter may be employed, though I prefer to use a filter such as that illustrated and described in which the direction of flow of the oil when flowing in one direction through the filter as a whole will be alternately reversed through each of the cylinders or elements of the filter so as to assist separation of the particles of foreign materials from the oil.

It will be evident that there may be slight changes made in the manner of carrying my invention into effect, and I intend to include all such variations, as fall within the scope of the appended claims, in this application in which a preferred form only of my invention is disclosed.

What I claim is:

1. An oil filter comprising a rectangular frame formed of pipe sections constituting end bars and side bars communicating with the end bars, the frame being horizontally disposed, an oil supply pipe having communication with one side and one end bar, an oil discharge pipe having communication with the other side and end bars, a set of valves for each end bar positioned in spaced relation therein, a plurality of filtering chambers positioned vertically within the frame and each having an open ended tubular body, caps removably connected with the upper and lower ends of the body, conduits establishing communication between the ends of said filtering chambers arranged so as to connect the chambers in series and releasably connected with the caps, a conduit leading from the lower end of one of said chambers and communicating with one of the end bars between the valves thereof, and a conduit leading from the upper end of a second filter chamber and communicating with the second end bar between the valves thereof.

2. An oil filter comprising a horizontally disposed frame formed of connected pipe sections and constituting a tubular conduit, an oil supply pipe communicating with one end portion of the tubular frame, an oil discharge pipe communicating with the second end portion of the frame, a set of valves controlling the passage of flow through the tubular frame, a vertically disposed filtering medium positioned within the frame, a conduit pipe communicating with the lower portion of the filtering medium and communicating with said tubular frame, and a second conduit communicating with the upper portion of the filtering medium and communicating with the tubular frame.

In testimony whereof I affix my signature in presence of two witnesses.

LEVI M. BOWMAN

Witnesses:
J. ULLERY,
H. L. CANNADY.